(12) United States Patent
Eijkelenboom

(10) Patent No.: US 10,534,441 B2
(45) Date of Patent: Jan. 14, 2020

(54) VIRTUAL CONTROL DEVICE AND SYSTEM

(71) Applicant: C&D Zodiac, Inc., Huntington Beach, CA (US)

(72) Inventor: Adriaan Eijkelenboom, Alkmaar (NL)

(73) Assignee: DRIESSEN AEROSPACE GROUP N.V., Alkmaar (NL)

( * ) Notice: Subject to any disclaimer, the term of this patent is extended or adjusted under 35 U.S.C. 154(b) by 0 days.

(21) Appl. No.: 16/049,500

(22) Filed: Jul. 30, 2018

(65) Prior Publication Data

US 2019/0033978 A1 Jan. 31, 2019

Related U.S. Application Data

(60) Provisional application No. 62/539,337, filed on Jul. 31, 2017.

(51) Int. Cl.
*G06F 3/01* (2006.01)
*B64D 11/02* (2006.01)
*G03H 1/00* (2006.01)

(52) U.S. Cl.
CPC .......... *G06F 3/017* (2013.01); *B64D 11/02* (2013.01); *G03H 1/0005* (2013.01); *G06F 3/016* (2013.01); *G03H 2001/0061* (2013.01)

(58) Field of Classification Search
None
See application file for complete search history.

(56) References Cited

U.S. PATENT DOCUMENTS

| | | | |
|---|---|---|---|
| 2015/0000025 A1* | 1/2015 | Clements | G06F 3/013 4/443 |
| 2015/0103011 A1* | 4/2015 | Large | G03H 1/0005 345/168 |
| 2015/0208191 A1 | 7/2015 | Sako et al. | |
| 2015/0300054 A1 | 10/2015 | Seibt et al. | |
| 2018/0084956 A1* | 3/2018 | Childress | A47K 10/48 |

OTHER PUBLICATIONS

International Search Report and Written Opinion issued in PCT/US2018/44422.

* cited by examiner

*Primary Examiner* — Gustavo Polo
(74) *Attorney, Agent, or Firm* — Jeffer Mangels; Butler & Mitchell LLP; Brennan C. Swain, Esq.

(57) ABSTRACT

A virtual control system that includes a control unit, a gesture recognition device, and a hologram generation device. The hologram generation device is configured to generate a hologram in a first volume of space. The gesture recognition device is configured to recognize a proper gesture within the first volume of space. The control unit is configured to send a signal to a component to be controlled when the gesture recognition device recognizes the proper gesture.

9 Claims, 3 Drawing Sheets

VIRTUAL CONTROL DEVICE AND SYSTEM

CROSS REFERENCE TO RELATED APPLICATIONS

This application claims the benefit of U.S. Provisional Application No. 62/539,337, filed Jul. 31, 2017, the entirety of which is incorporated herein by reference.

FIELD OF THE INVENTION

The present invention relates generally to a virtual control device and system, and more particularly to a virtual control device and system that can be used in an aircraft lavatory.

BACKGROUND OF THE INVENTION

Public restrooms, especially those in aircraft, can be dirty. As a result, passengers attempt to touch as few things as possible in the lavatory. Accordingly, a system for providing touchless "buttons" or controls is an improvement over current aircraft lavatories.

SUMMARY OF THE PREFERRED EMBODIMENTS

In accordance with a first aspect of the present invention there is provided a virtual control system that includes a control unit, a gesture recognition device, and a hologram generation device. The hologram generation device is configured to generate a hologram in a first volume of space. The gesture recognition device is configured to recognize a proper gesture within the first volume of space. The control unit is configured to send a signal to a component to be controlled when the gesture recognition device recognizes the proper gesture. In a preferred embodiment, the virtual control system includes an acoustic field generator that is configured to generate an acoustic field in a second volume of space. The first volume of space and second volume of space at least partially overlap to form a virtual control volume. The gesture recognition device is configured to recognize the proper gesture within the virtual control volume. It will be appreciated that the proper gesture is the only gesture by a user that will cause a signal to be sent to the component to be controlled (and switched from a first state to a second state). For example, if a twisting motion is the proper gesture for a knob, if the user just places their hand within the first volume of space or virtual control volume no signal will be sent. In other words, the door won't be opened. The need for a proper gesture prevents components from being switched on or off accidentally.

In a preferred embodiment, the virtual control system is associated with an aircraft lavatory and the hologram is in the shape of or will be perceived by a user as one of a knob, a button, a lever or a switch. Preferably, the hologram is generated in a location adjacent the component to be controlled.

In accordance with another aspect of the present invention there is provided a method of switching a component to be controlled from a first state to a second state. The method includes providing a virtual control system that includes a control unit, an acoustic field generator, a gesture recognition device, and a hologram generation device. The hologram generation device is configured to generate a hologram in a first volume of space and the acoustic field generator is configured to generate an acoustic field in a second volume of space. The first volume of space and second volume of space at least partially overlap to form a virtual control volume. The gesture recognition device is configured to recognize, perceive, determine or detect a human motion or gesture within the virtual control volume. The method further includes projecting a hologram in the first volume of space, generating an acoustic field in the second volume of space, sending a signal to the control unit when the gesture recognition device recognizes a proper gesture within the virtual control volume, and sending a signal from the control unit to the component to be controlled and switching the component to be controlled from the first state to the second state.

In accordance with another aspect of the present invention there is provided an aircraft lavatory that includes an enclosure that defines a lavatory interior, a door that is movable between an open and a closed position, a sink positioned in the lavatory interior, a toilet positioned in the lavatory interior, and a virtual control system. The virtual control system includes a control unit, a gesture recognition device and a hologram generation device. The hologram generation device is configured to generate a hologram in a first volume of space within the lavatory interior and the gesture recognition device is configured to recognize a proper gesture within the first volume of space. The control unit is configured to send a signal to a component to be controlled when the gesture recognition device recognizes the proper gesture. The component to be controlled is associated with one of the toilet, sink or door. In a preferred embodiment, the aircraft lavatory also includes an acoustic field generator that is configured to generate an acoustic field in a second volume of space within the lavatory interior. The first volume of space and second volume of space at least partially overlap to form a virtual control volume. The gesture recognition device is configured to recognize the proper gesture within the virtual control volume.

The present invention allows the activation of controls without actually touching any physical object. In a preferred embodiment, the present invention is used in an aircraft lavatory. However, this is not a limitation on the present invention and the system can be used in other lavatories and in any other environment where touchless controls are desired. The invention offers a user a visible and/or tangible control without the need to actually touch a physical object to activate that control. Generally, the present invention combines an acoustic field (for tactile sensation) with a hologram (for visual sensation) together with a gesture recognition device. Gesture recognition is the mathematical interpretation of a human motion by a computing device. In use, the user sees the hologram of the control device, and has the perception of touching the control device while activating the control, without actually touching a physical and potentially dirty or hazardous object.

In a preferred embodiment, the present invention includes a control unit (CPU), laser system (or other hologram generating device), acoustic field generator and gesture recognition device. The control unit directs the laser system to create a hologram. For example, the hologram may only be generated when the door is opened and someone enters the lavatory. In this situation the lavatory includes a timer where the hologram is turned off after a certain period of time as elapsed and is turned back on when the door is opened. The lavatory may also include a motion sensor therein that senses when a person is in the lavatory and activates the holograms and acoustic fields for the virtual control devices therein. It will be appreciated that all of the components of the virtual control system (acoustic generator, hologram generator, motion sensor, gesture recognition device, etc.) are all in communication with the control unit (or multiple control units).

The control unit also directs the acoustic field generator to generate an acoustic field having a location and shape that at least partially, and preferably fully, coincides with the location and shape of the hologram. The hologram and acoustic field are referred to together herein as the "virtual control device." As a result, in use, the user perceives the hologram and the generated acoustic field as a visible (hologram) and touchable (the "feeling" of the generated acoustic field) control. When the user "presses" or "turns" the virtual control device by placing their finger or hand in the hologram, they feel the acoustic field and the action controlled by the virtual control device is activated. The "pressing" of the virtual control device by the user is registered or sensed by the gesture recognition device, which processes the hand motion resulting in a signal to the control unit which transforms the signal into the required activation or action.

The control (central processing) unit sends signals to the hologram generation device and the acoustic field generator. The control unit receives signals from the gesture recognition device, which processes the human gestures. When the control unit receives a signal from the gesture recognition device it sends a signal to perform an action (e.g., unlatch a lavatory door to allow it to be opened).

The laser system comprises all the necessary equipment to create a well-visible hologram. Holography is well known and therefore a detailed description will be omitted. For reference see https://en.wikipedia.org/wiki/Holography (the Wikipedia entry on holography), the entirety of which is incorporated by reference herein. In a preferred embodiment, the acoustic field generator generates an acoustic field strong enough to excite human tactile sensors in such a way that it is perceived as touching a physical object. An exemplary acoustic field generator is taught in U.S. Patent Publication No. 2016/0124080 (the '080 publication), the entirety of which is incorporated by reference herein. As disclosed in the '080 publication, the acoustic waves of the acoustic field comprise ultrasound waves. The acoustic field may be formed using ultrasound transducers. Using ultrasound transducers gives rise to an advantage in the area of, for example, haptic feedback, where the transducer array may be operated such that a user feels an acoustic radiation force produced by the acoustic field. Modulating the acoustic waves at a frequency between 0.1 Hz to 500 Hz gives rise to an advantage of increasing the suitability of the apparatus for use in haptic feedback applications, since tactile receptors in skin are most sensitive to changes in skin deformation at these frequencies.

Preferably, the location and shape of the hologram and acoustic field at least partially coincide so these are perceived by the user as a "virtual" physical object. Therefore, in use, the user recognizes the virtual control device as they would a physical control device. For example, in the case of the opening of a lavatory door, the virtual control device can appear as or have the shape of a rotatable knob or a pivotal lever. In other cases, the virtual control device can be a button, switch, handle, toilet flush button, handle or lever, faucet knob, etc. When the user "touches" the virtual knob (puts their hand in the same area or volume occupied by the hologram) the user feels acoustic field, which gives the user the sensation of touching the knob. It will be appreciated that the component to be controlled is typically a switch or latch or other component associated with a larger component or component being used by the passenger in the lavatory. For example, for a toilet the actual component to be controlled may be a switch that causes the toilet to flush. For a sink, the actual component to be controlled may be a switch that turns the water on or off. For a door knob the actual component to be controlled may be a latch that moves between a latched position and an unlatched position. Those of ordinary skill in the art will understand what the "component to be controlled" is with each associated action that is desired by operating each virtual control device.

The action of "touching" the virtual control device (knob), e.g., by the user twisting their hand, sends a signal to the gesture recognition device that then signals the control unit to open the door. Holography is well known and therefore a detailed description will be omitted. For reference see https://en.wikipedia.org/wiki/Gesture_recognition (the Wikipedia entry on gesture recognition), the entirety of which is incorporated by reference herein. Gesture recognition is a component of computer science and language technology and is used for interpreting human gestures via mathematical algorithms. Gestures can originate from any bodily motion or state but commonly originate from the face or hand. Users can use simple gestures to control or interact with devices without physically touching them. Gesture recognition devices can be, for example, cameras and computer vision algorithms. In other situations the gesture may cause the control device to open a trash bin, turn the water on or off, turn a light on or off, put the toilet seat up or down, dispense soap, flight attendant call, etc. These components are referred to generally herein as a "component to be controlled" or "components to be switched on or off."

It will be appreciated that the control unit is in electrical or data communication with the component to be switched on or off so that when a signal by the control unit (after receiving a signal from the gesture recognition device) is sent to the component to be switched on or off it is operated properly.

The present invention can be used in other scenarios outside of a lavatory. For example the invention can be used in the "touching" of a virtual human body (possibly an actual human seen via video or the like) that can be seen (as a hologram) and touched (via the generated acoustic field) without the user physically being in the same location as the subject. At the location of the subject a similar acoustic field can be generated that provides a sense of touch to the subject.

It will be appreciated by those of ordinary skill in the art that a separate system can be used for each lavatory component or a single or multiple systems can project to or be associated with a plurality of components. In other words, in an embodiment of the invention, a laser system, acoustic field generator and gesture recognition device can be used separately for each lavatory component to be controlled. In another embodiment a single system can project to two or more locations, with one or more than one unit controlling the projections, signals and activations.

Disclosed herein is a method of switching a component to be controlled from a first state to a second state (e.g., off to on, closed to open or latched to unlatched). The method includes providing a virtual control system that includes a control unit, an acoustic field generator, a gesture recognition device, and a hologram generation device. The hologram generation device is configured to generate a hologram in a first volume of space, and the acoustic field generator is configured to generate an acoustic field in a second volume of space. The first volume of space and second volume of space at least partially overlap to form a virtual control volume (or area—the acoustic field may be generated on a surface). The gesture recognition device is configured to recognize a human motion or gesture within the virtual control volume. The method also includes projecting a hologram in the first volume of space, generating an acoustic field in the second volume of space, gesturing within the virtual control volume, wherein the gesture recognition device recognizes the gesture and sends a signal to the control unit. And, wherein the control unit sends a signal to the component to be controlled and switches it from the first state to the second state.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
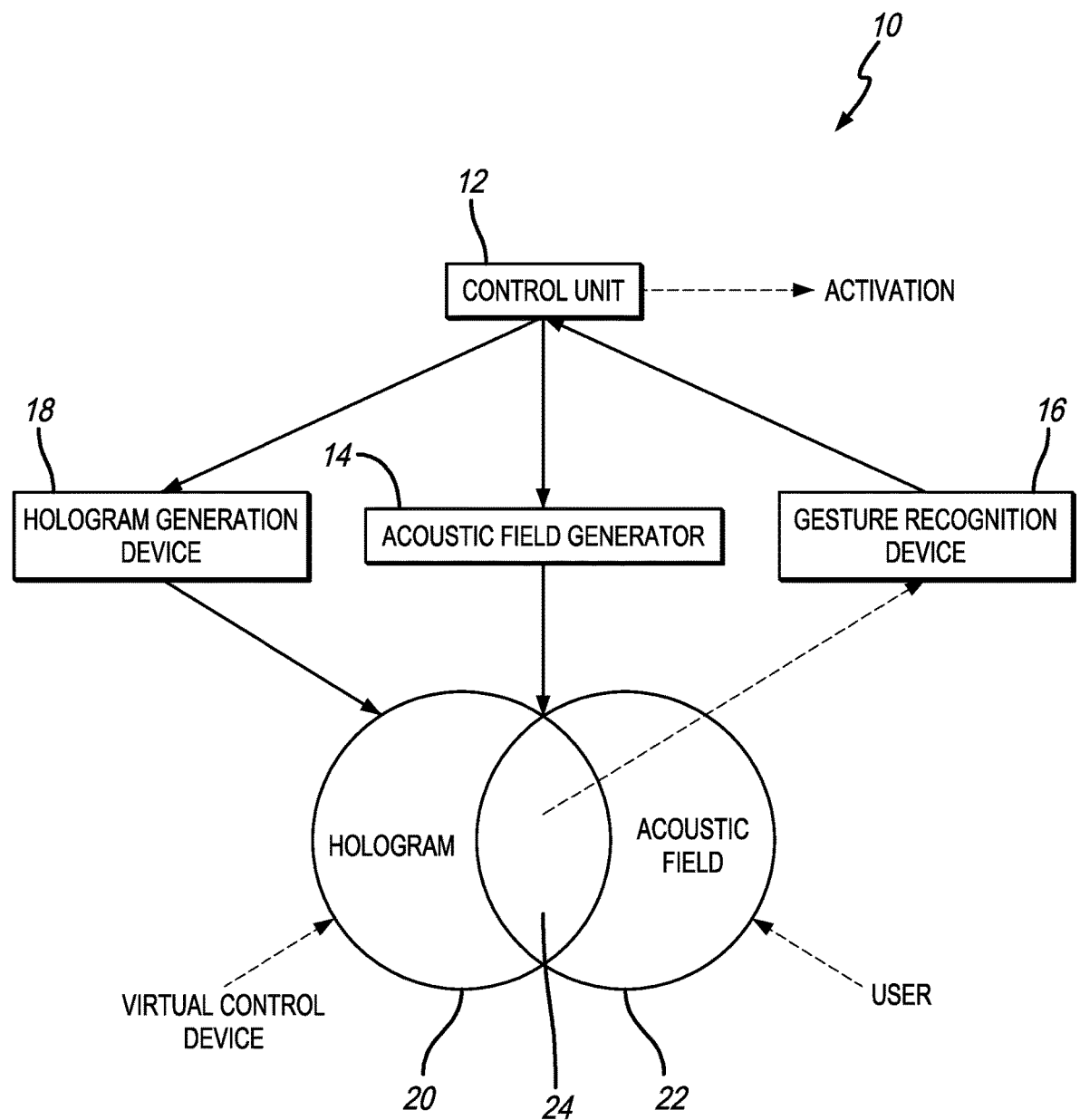
FIG. 1 is a flow diagram in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
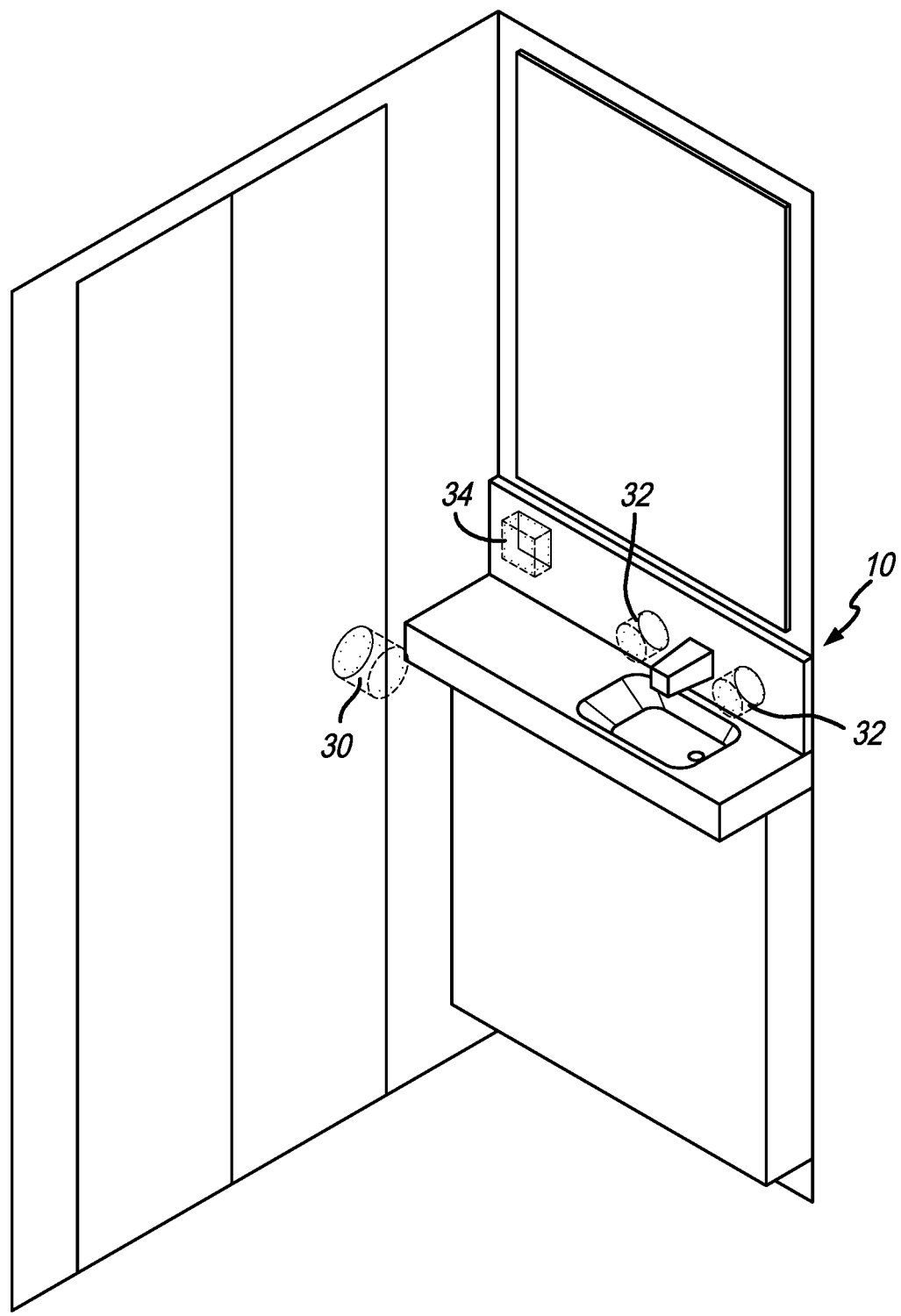
FIG. 2 is a perspective view of the interior of a lavatory showing a plurality of virtual control devices therein.
Figure 3:
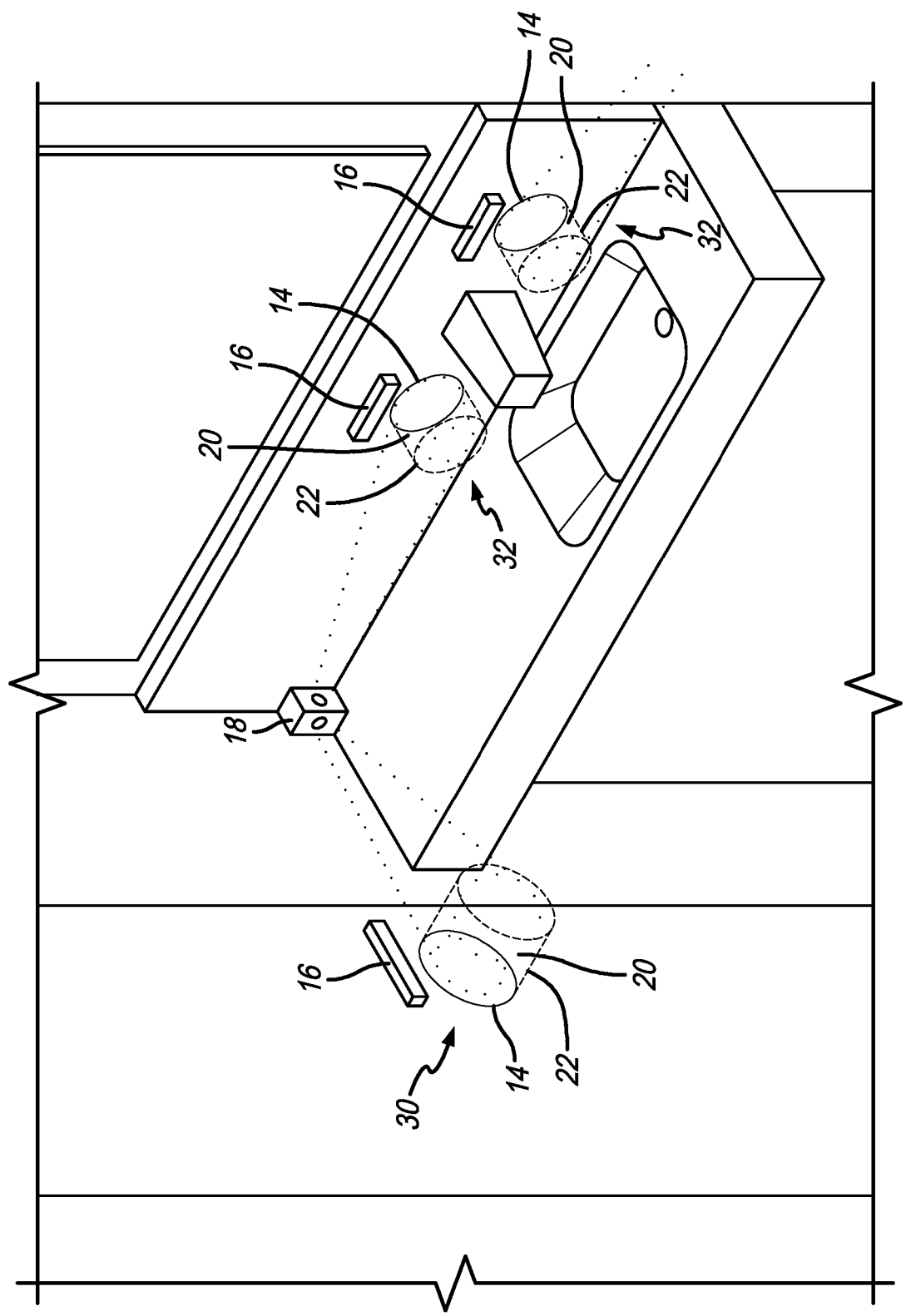
FIG. 3 is a perspective view of a portion of the interior of a lavatory showing a plurality of control devices therein.

Referring now to the drawings, wherein the showings are for purposes of illustrating the present invention and not for purposes of limiting the same, FIGS. 1-3 show a virtual control system 10 that includes at least one virtual control device that is used to switch a component to be controlled from a first state to a second state (e.g., on to off). The system includes a control unit 12, an acoustic field generator 14, a gesture recognition device 16, and a hologram generation device 18. The hologram generation device 18 is configured to generate a hologram in a first volume of space 20, the acoustic field generator 14 is configured to generate an acoustic field in a second volume of space 22. As shown in FIG. 1, the first volume of space 20 and second volume of space 22 at least partially overlap to form a virtual control volume 24. The gesture recognition device 16 is configured to recognize a human motion or gesture within the virtual control volume 24.

It will be appreciated that the virtual control system and the individual virtual control devices described herein are shown and described as being used within an aircraft lavatory. However, this is only exemplary and is not a limitation on the present invention. The virtual control system can be used in any situation or location where a component is controlled and can be switched between a first state and a second state or multiple states. The system 10 can include multiple virtual control devices that are controlled by a single control unit 12.

In use, the hologram generation device 18 projects or generates a hologram in the first volume of space 20 and the acoustic field generator 14 generates an acoustic field in the second volume of space 22. As a result, a user can see the hologram, thereby providing a visual representation of where the virtual control device is located. For example, as shown in FIG. 2, the virtual control device can be a "virtual" door knob 30, "virtual" hot and cold faucet knobs 32, or a "virtual" flight attendant call button 34 within a lavatory. FIG. 3 shows exemplary positioning of a hologram generating device 18 and gesture recognition devices 16 near the virtual control volumes 24. As shown, the hologram generating device 18 projects the holograms in a first volume of space 20 (shown in dotted lines), the acoustic field generators 14 generate the acoustic fields in a second volume of space 22 (shown in dashed lines), and where they overlap, the virtual control volume 24 or device is formed. And, therefore, when the user places their hand in the same general location as the hologram of the door knob 30 (i.e., in the virtual control volume 24), they will feel the acoustic field thereby giving them the sensation of touching the door knob. The user then gestures within the virtual control volume by twisting their hand in the usual motion for turning a door knob. The gesture recognition device 16 recognizes the gesture (the twisting motion) and sends a signal to the control unit 12. The control unit 12 then sends a signal to the component to be controlled (i.e., the latch in the closed state) and switches it from the first state to the second state (i.e., from closed to open, thereby allowing the user to open the door).

It will be appreciated by those of ordinary skill in the art that the components of the system 10 can be positioned anywhere that they can be perform their function. For example, within the lavatory interior there may be a single hologram generation device that projects or generates holograms for all of the different "virtual" controls within the lavatory and/or a single acoustic field generator that generates acoustic fields for all of the different "virtual" controls within the lavatory. In another embodiment, there may be separate hologram generation devices and acoustic field generators for each of the different "virtual" controls within the lavatory. There may also be single or multiple gesture recognition devices. The components discussed above may be mounted on or in the walls, doors, ceiling or other surfaces in the lavatory. One or more of the components can also be contained or positioned or within a housing or unit. In another embodiment, the acoustic field generator can be omitted and the virtual control system can omit the "touch sensation" component of the system.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A virtual control system comprising:
    a control unit,
    a gesture recognition device,
    a hologram generation device, and
    an acoustic field generator,
    wherein the hologram generation device is configured to generate a hologram in a first volume of space, wherein the acoustic field generator is configured to generate an acoustic field that includes ultrasonic acoustic waves in a second volume of space, wherein the first volume of space and second volume of space at least partially overlap to form a virtual control volume, wherein the gesture recognition device is configured to recognize a proper gesture within the virtual control volume, and wherein the control unit is configured to send a signal to a component to be controlled when the gesture recognition device recognizes the proper gesture.

2. The virtual control system of claim 1 wherein the virtual control system is associated with an aircraft lavatory, and wherein the hologram is one of a knob, a button, a lever or a switch.

3. The virtual control system of claim 2 wherein the hologram is generated in a location adjacent the component to be controlled.

4. The virtual control system of claim 3 further comprising a motion sensor, wherein the hologram is generated when the motion sensor senses motion.

5. A method of switching a component to be controlled from a first state to a second state, the method comprising the steps of:
- providing a virtual control system that includes a control unit, an acoustic field generator, a gesture recognition device, and a hologram generation device, wherein the hologram generation device is configured to generate a hologram in a first volume of space, wherein the acoustic field generator is configured to generate an acoustic field that includes ultrasonic acoustic waves in a second volume of space, wherein the first volume of space and second volume of space at least partially overlap to form a virtual control volume, wherein the gesture recognition device is configured to recognize a human motion or gesture within the virtual control volume,
- projecting a hologram in the first volume of space,
- generating an acoustic field in the second volume of space,
- sending a signal to the control unit when the gesture recognition device recognizes a proper gesture within the virtual control volume, and
- sending a signal from the control unit to the component to be controlled and switching the component to be controlled from the first state to the second state.

6. The method of claim 5 wherein the virtual control system is associated with an aircraft lavatory, and wherein the hologram is one of a knob, a button, a lever or a switch.

7. An aircraft lavatory comprising:
- an enclosure that defines a lavatory interior,
- a door that is movable between an open and a closed position,
- a sink positioned in the lavatory interior,
- a toilet positioned in the lavatory interior,
- a virtual control system, that includes a control unit, a gesture recognition device, a hologram generation device, and an acoustic field generator, wherein the hologram generation device is configured to generate a hologram in a first volume of space within the lavatory interior, wherein the acoustic field generator is configured to generate an acoustic field that includes ultrasonic acoustic waves in a second volume of space within the lavatory interior, wherein the first volume of space and second volume of space at least partially overlap to form a virtual control volume, wherein the gesture recognition device is configured to recognize a proper gesture within the virtual control volume, wherein the control unit is configured to send a signal to a component to be controlled when the gesture recognition device recognizes the proper gesture, and wherein the component to be controlled is associated with one of the toilet, sink or door.

8. The aircraft lavatory of claim 7 wherein the hologram is configured to be generated when the door is moved from the closed position to the open position.

9. The aircraft lavatory of claim 7 further comprising a motion sensor, wherein the hologram is generated when the motion sensor is activated.

* * * * *